July 16, 1929.  R. S. OSBORNE  1,721,231
LUBRICATOR
Filed Nov. 28, 1927

Inventor
Raymond S. Osborne
By
Attorneys

Patented July 16, 1929.

1,721,231

UNITED STATES PATENT OFFICE.

RAYMOND S. OSBORNE, OF WYOMING, OHIO.

LUBRICATOR.

Application filed November 28, 1927. Serial No. 236,056.

This invention relates to lubricators and is particularly directed to a lubricator of the type delivering lubricant into the compressed air feed line of a pneumatic tool. These lubricators are inserted directly in the air passageway of the tool, the lubricator device being provided with a central uninterrupted passageway as a section of the air passageway.

It is an object of the invention to provide a positive automatic oil delivery means for force feeding a measured quantity of lubricant from a reservoir into the air passageway to the tool, each time the tool is started.

It is another object of this invention to eliminate continual seepage or flow of lubricant from the reservoir into the air passageway and the resultant wasting of lubricant by providing a periodic valve controlled delivery of lubricant.

Still another object is to provide a lubricant reservoir having air pressure therein and valve controlled inlet and outlet ports, the inlet valve functioning to equalize the respective line and reservoir pressures and the outlet valve being the lubricant delivery valve actuated by differential between reservoir and line pressures for force feeding a measured quantity of lubricant.

Still another object is to provide a lubrication unit adapted for insertion within the tool or on the tool or as a combined coupler and lubricator in the line apart from the tool.

Other objects and advantages will be more fully set forth in the description of the accompanying drawings, forming a part of this specification, in which.

The lubricator herein illustrated is constructed for insertion in the feed line of a pneumatic tool and may be attached directly to the tool or incorporated within the tool as a part of the tool structure and it is likewise possible to insert the device as a coupler in the feed line apart from the tool. A central uninterrupted passageway is provided longitudinally of the lubricator, constituting the lubricator as a coupler, apart from its oil feeding characteristics, being non-interfering with normal compressed air feed to the tool.

Figure 1:
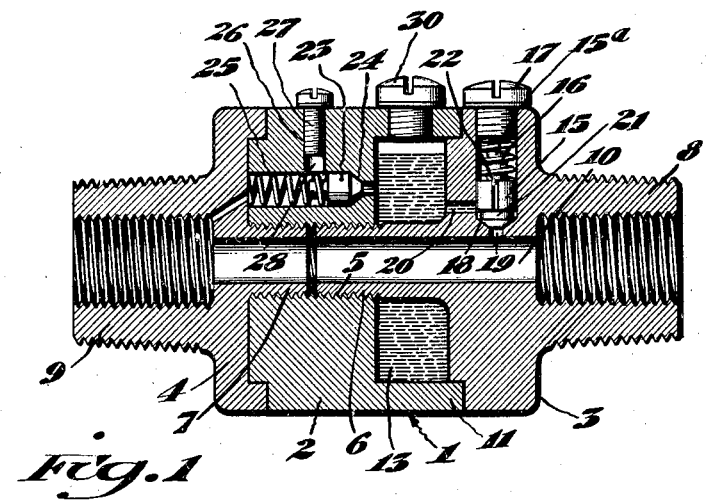
Figure 1 is a longitudinal sectional view taken centrally of the lubricator and showing the lubricator in filling position.

Referring to Figure 1 of the drawings, the lubricator is indicated generally at 1 and comprises three circular sections, as an intermediate section 2 and end sections 3 and 4 of the same diameter as the intermediate section and screwed into and against the intermediate section at each end thereof. The section 2 has a concentric threaded bore 5 for receiving the threaded concentric hubs 6 and 7 of the respective outer elements. The outer ends of the elements 3 and 4 have exteriorly and interiorly threaded hubs 8 and 9 formed thereon and a plain and concentric bore 10 extends longitudinally of the sections from the internal threads to the opposing ends of the hubs 7 and 8 forming a continuous passageway through the lubricator.

The central body section is recessed from one end leaving a circular outwardly extending flange 11. The opposing face of the end section 3 is marginally recessed to matingly engage or seat the end of the flange 11. The inner face of the end element 4 is recessed in a manner similar to the central body section and the opposing end of the central section fitted thereagainst in the same manner as the previously described connection. The recess within the flange 11 however, is of considerable depth so that a space is provided between the face of the end of the element 3 and the bottom of the recess in the central section. The space thus provided constitutes an oil supply reservoir 13 for the lubricator, being concentrically traversed by the hub section 3 and thus separated from the main passageway of the lubricator.

Passageways herein referred to as inlet and outlet are provided from the main air passageway to the reservoir and from the reservoir to the main passageway, these inlet and outlet passageways being valve controlled. The inlet port has a check valve 15 sliding therein, this valve 15 moving in a radially extending passageway against a compression spring 16 held against the outer end of the valve by means of a screw 17 closing the outer end of the radially extended valve containing bore.

The inner end of the valve is tapered so as to engage a tapered seat 18 formed at the inner end of the bore and a constricted passageway 19 is provided between the valve seat and the main air passageway. A channel 20 extending laterally from the valve containing bore connects the same with the lubricant reservoir 13. The valve 15 has its taper corner annularly grooved as at 21, this groove being in registry with the channel 20 and a longitudinally extending groove 22 extends from the annular groove to the outer end of the valve. For reasons hereinafter described, this grooving of the valve wall provides for a uniform pressure within the space occupied respectively by the spring and the reservoir. The valve 15 unseats very slightly during operation so that the annular groove is always in registry with the channel 20. The provision of the groove at the corner of the valve obviates the necessity of a sharp bore corner for proper seating of the valve. A stem 15ª is provided at the outer end of the valve and adapted to engage the screw 17 to limit valve unseating movement.

The outlet passageway extends parallel to the main air passageway connecting the reservoir with the internally threaded portion of the end section 4. This outlet passageway is valve controlled, the valve 23 seating on a tapered seat 24 at the end toward the reservoir and acting against a compression spring 25, compressed between the outer end of the valve and the outer end of the large valve containing bore. This valve 23 is sealingly slidable within its bore preventing the escape of oil past the valve. The valve as an outlet valve controls the oil delivery and the passageway contains means for allowing the feeding of a measured quantity of lubricant from the reservoir, provided as follows:

Bore 26 extends radially from the valve containing bore to the exterior of the intermediate section, this bore being screw threaded to receive a screw 27, the screw extending not quite to the valve containing bore but leaving a pocket 28 between the end of the screw and the valve containing bore, this pocket adapted to receive a quantity of oil when the delivery control valve is slid past the same as will be hereinafter fully described in a detailed operation of the lubricator. A stem is provided on the valve 23 for engaging the end wall of the bore for limiting the movement of the valve at a point just beyond the pocket 28. The reservoir is filled through an opening closed by means of a screw plug 30.

When the pneumatic tool is not being used the line pressure, that is the pressure in the passageway, is the same as the pressure within the lubricant reservoir due to the functioning of the valve 15. When the tool is operated the pressure in the main line drops and as a result the pressure in back of the oil delivery valve drops accordingly, being in direct connection with the main passageway. This allows the oil delivery valve to be forced open by the pressure within the reservoir and the valve is slid past the oil pocket 28 at which time a small quantity of oil is forced into and suspended in the pocket. When the operation of the tool ceases and the pressure in the main line has again developed to normal pressure the oil delivery valve returns to closed or seated position. The oil in the pocket 28 is thus left outside the reservoir and in a position to be drawn outwardly into the passageway when the pneumatic tool is again operated, the velocity thereby created in the passageway drawing the oil from the pocket, this action being aided by the fact that a small percentage of air is pocketed between the quantity of oil and the end of the screw 27, this tending to eject the oil from the pocket. When the oil delivery valve is again seated, due to the rise of line pressure to normal, the pressure within the reservoir is equalized with normal line pressure through the valve 15 it being apparent that there will be a slight drop in the pressure of the reservoir due to the ejecting of the oil therefrom. It is thereby provided that the reservoir pressure is permitted to develop at the rear of the valve 15 due to the grooving of the valve surface, the valve 15 acting between the pressure in the reservoir and the line pressure, and the compression spring 16 providing the differential for firmly seating the valve when the respective pressures have been equalized and this spring impelled seating of the valve 15 being necessary to prevent any back flow of oil into the air passageway during the opening and closing of the valve. It is thus provided that, upon each starting of the pneumatic tool, a measured quantity of oil is fed into the air passageway, the quantity delivered being governed by the size of the pocket 28, the area of the pocket of course varied by varying the length of the screw 27.

If it is desired a plurality of outlet valves may be provided in order to feed a greater quantity of oil.

Figure 2:
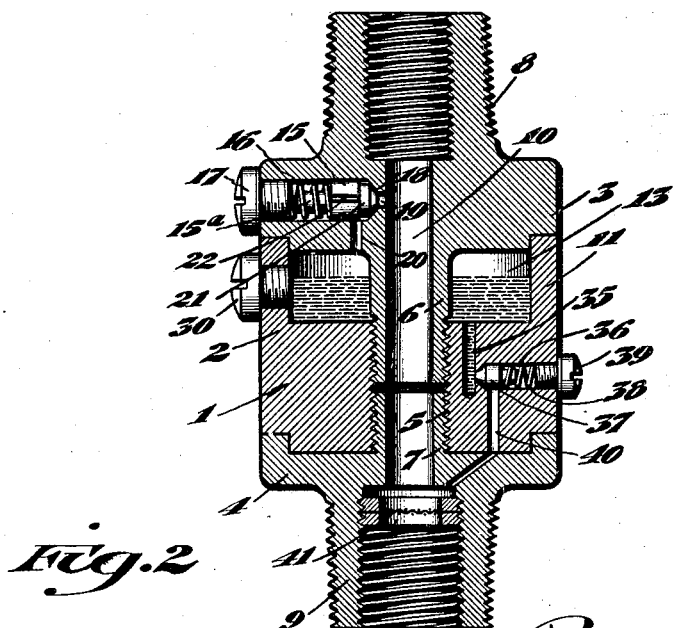
Figure 2 illustrates a modified form of lubricator, the view being taken similar to Figure 1 but showing the lubricator in a preferable service position, which position may of course be assumed by the first type of lubricator during service.

Figure 2 illustrates a modified type of lubricator, this type being identical with the type shown in Figure 1 with the exception of the oil delivery or outlet valve. A passageway 35 extends from the reservoir into the intermediate section 2, parallel to the air passageway of the lubricator. A valve containing bore 36 extends radially from this passageway 35 to the exterior of the device. A valve 37 is held against a tapered seat at the inner end of the radial passageway by means of a spring 38 held under compression against the valve by means of a screw 39 closing the outer end of the radial bore.

A continuation of the passageway 35, indicated at 40, extends laterally from the valve 37 to the main air passageway of the lubricator. In this type of outlet valve the amount of oil delivered is governed by the compression of the spring 36.

When the line pressure drops due to operation of the tool the excess pressure within the reservoir forces oil past the valve 37 and into the main air passageway the valve being held open momentarily until the excess pressure in the oil reservoir is exhausted. A screen 41 may be inserted within the outlet end of the lubricator for screening the air and oil as they pass through the same.

The views of the drawing are in position to show a filling position and preferably operable position for the lubricator. It is of course best to have the lubricator in a vertical position with the oil always lying against the outlet or oil delivery passage, inasmuch as the entire contents of the reservoir may be fed when the lubricator is thus disposed. When the device is on or within the tool it may be used in a horizontal or inclined position and the vibration will sufficiently splash the oil around so as to get the desired feed.

Having described my invention, I claim:

1. A device of the class described, comprising, a body having a passageway for compressed air therethrough and a lubricant reservoir therein, said reservoir and passageway connected by inlet and outlet ports, a valve operating in said inlet port for equalizing passageway and reservoir pressures, and a valve in said outlet port, said outlet port having a recess in its side wall normally in communication with the passageway through the port and opened to the reservoir by opening of the valve, said outlet valve opening due to drop in passageway pressure for delivering a quantity of lubricant to the recess, whereby the delivered lubricant is subsequently drawn into the passageway by velocity of air in the passageway and upon the closing of said valve.

2. A device of the class described, comprising, a body having a passageway for compressed air therethrough, a lubricant reservoir adjacent to said passageway, said passageway communicating with said reservoir through an inlet port, said reservoir communicating with said passageway through an outlet port, a valve operating in said outlet port under reservoir pressure as line pressure drops, and means for governing the quantity of lubricant delivered to the passageway by the actuation of the outlet valve.

3. A device of the class described, comprising, a body having a passageway for compressed air, a lubricant reservoir disposed adjacent to said passageway, an inlet port connecting said passageway and reservoir for the admission of compressed air to the reservoir, an outlet port connecting said passageway and reservoir, a valve slidable in said outlet port, and said outlet port provided with a recess in communication with the passageway when the valve is closed and in communication with the reservoir when the valve is open whereby the recess receives and measures the quantity of lubricant passing through the port upon each actuation of the valve.

4. A device of the class described, comprising, a body having a passageway, a lubricant reservoir in said body, said reservoir communicating with said passageway through inlet and outlet ports, a valve in said inlet port opening to the reservoir under determined pressure in said passgeway, and a valve in said outlet port opening under determined pressure in the reservoir, said outlet port formed for governing the discharged quantity of lubricant upon each actuation of the valve.

5. A device of the class described, comprising, a body having a passageway therein and a lubricant reservoir disposed about said passageway, said reservoir and pasageway communicating through ports, a reservoir intake control valve in one of said ports actuated by pressure fluctuation in the passageway, a lubricant discharge control valve in the other port actuated by pressure in the reservoir, said discharge port formed for governing the quantity of lubricant discharge in each actuation of the discharge valve.

6. A device of the class described, comprising, a hollow cylinder, a head disposed at each end thereof, a central tubular portion securing the cylinder and heads together, said tubular portion providing a central passageway, said cylinder providing a lubricant reservoir, and said passageway and said reservoir in communication through valve controlled ports for intermittent equalization of passageway pressure and reservoir pressure and discharge of lubricant from said reservoir into said passageway.

In witness whereof, I hereunto subscribe my name.

RAYMOND S. OSBORNE.